US009264804B2

(12) United States Patent
Åhgren et al.

(10) Patent No.: US 9,264,804 B2
(45) Date of Patent: Feb. 16, 2016

(54) NOISE SUPPRESSING METHOD AND A NOISE SUPPRESSOR FOR APPLYING THE NOISE SUPPRESSING METHOD

(75) Inventors: Per Åhgren, Knivsta (SE); Anders Eriksson, Uppsala (SE); Zohra Yermeche, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 246 days.

(21) Appl. No.: 13/976,180

(22) PCT Filed: Dec. 29, 2010

(86) PCT No.: PCT/SE2010/051493
§ 371 (c)(1),
(2), (4) Date: Jun. 26, 2013

(87) PCT Pub. No.: WO2012/091643
PCT Pub. Date: Jul. 5, 2012

(65) Prior Publication Data
US 2013/0272540 A1 Oct. 17, 2013

(51) Int. Cl.
*H04B 15/00* (2006.01)
*H04R 3/00* (2006.01)
*G10K 11/16* (2006.01)

(52) U.S. Cl.
CPC .................. *H04R 3/002* (2013.01); *H04R 3/00* (2013.01); *H04R 2410/05* (2013.01); *H04R 2499/11* (2013.01)

(58) Field of Classification Search
CPC ...... H04R 2499/11; H04R 3/00; H04R 3/002; H04R 2203/00; H04R 2410/05; H04R 3/005; G10L 21/0208; G10L 2021/02166; G10K 11/178; G10K 2210/1081
USPC ...................... 381/94.1, 71.1–71.12, 92, 318; 704/233, 226; 455/563
See application file for complete search history.

(56) References Cited

U.S. PATENT DOCUMENTS

2002/0193130 A1* 12/2002 Yang ...................... H04R 3/005 455/501
2007/0154031 A1 7/2007 Avendano et al.

(Continued)

FOREIGN PATENT DOCUMENTS

JP A H04-184400 7/1992
JP A H11-305792 11/1999

(Continued)

OTHER PUBLICATIONS

Extended European Search Report, PCT/SE2010/051493 mailed on Nov. 14, 2013, 14 pages.

(Continued)

*Primary Examiner* — Vivian Chin
*Assistant Examiner* — Ammar Hamid
(74) *Attorney, Agent, or Firm* — Myers Bigel Sibley & Sajovec, P.A.

(57) ABSTRACT

A method for suppressing noise of a first signal captured via a primary microphone is provided. A primary and a reference microphone are arranged on a communication device to capture noise and intermittent speech. A determination is made whether the first signal comprises non-stationary signal components or substantially stationary noise, and whether the first signal comprises substantially far-field noise in case it was determined that it comprises non-stationary signal components. A noise power spectrum estimate of the first signal is updated with a stationary noise power spectrum estimate if the first signal is considered to comprise substantially stationary noise or a far-field noise power spectrum estimate if the first signal is considered to comprise substantially far-field noise. A frequency response is computed on the basis of the estimated noise power spectrum. Noise from the first signal is suppressed by applying the frequency response on the first signal.

22 Claims, 5 Drawing Sheets

(56) References Cited

U.S. PATENT DOCUMENTS

| | | | | |
|---|---|---|---|---|
| 2009/0012783 | A1* | 1/2009 | Klein | G10L 21/0208 704/226 |
| 2010/0081487 | A1 | 4/2010 | Chen et al. | |
| 2011/0264447 | A1* | 10/2011 | Visser | G10L 25/78 704/208 |

FOREIGN PATENT DOCUMENTS

| | | | | | |
|---|---|---|---|---|---|
| JP | A 2001-159899 | | 6/2001 | | |
| JP | A 2011-191668 | | 9/2011 | | |
| WO | WO 96/24128 | | 8/1996 | | |
| WO | WO 00/62579 | A1 | 10/2000 | | |
| WO | WO 03015275 | A1 | 2/2003 | | |
| WO | WO 2006/012578 | A2 | 2/2006 | | |
| WO | WO 2007/059255 | A1 | 5/2007 | | |
| WO | WO 2008/082793 | A2 | 7/2008 | | |
| WO | WO 2010/002676 | A2 | 1/2010 | | |
| WO | WO 2010/048620 | A1 | 4/2010 | | |
| WO | WO 2010/104995 | A2 | 9/2010 | | |
| WO | WO 2010104995 | A2 | * | 9/2010 | G10K 11/1784 |
| WO | WO 2012/091643 | | 7/2012 | | |

OTHER PUBLICATIONS

Boll S F: Suppression of acoustic noise in speech using spectral subtraction: IEEE Transactions on Acoustics, Speech and Signal Processing, IEEE Inc. New York, USA; vol. 27, No. 2; Apr. 1, 1979, XP000560467, ISSN: 0096-3518, DOI: 10.1109/TASSP.1979.1163209; pp. 113-120.

International Search Report, PCT/SE2010/051493, Nov. 10, 2011.

Written Opinion of the International Searching Authority, PCT/SE2010/051493, Nov. 10, 2011.

Written Opinion of the International Preliminary Examining Authority, PCT/SE2010/051493, Dec. 21, 2012.

International Preliminary Report on Patentability, PCT/SE2010/051493, Apr. 16, 2013.

Nimma Yousefian et al., “Using power level difference for near field dual-microphone speech enhancement”, Applied Acoustics 70 (2009), pp. 1412-1421.

3GPP, Technical Specification, “3rd Generation Partnership Project; Technical Specification Group Services and System Aspects; Multimedia Broadcast/Multicast Service (MBMS); Protocols and Codecs (Release 9)”, 3GPP TS 26.346 V9.15.0 (Jun. 2014), 158 pp.

3GPP, Technical Specification, “3rd Generation Partnership Project; Technical Specification Group Services and System Aspects; 3G Security; Security of Multimedia Broadcast/Multicast Service (MBMS) (Release 9)”, 3GPP TS 33.246 V9.1.0 (Dec. 2012), 69 pp.

Open Mobile Alliance Ltd., “Service and Content Protection for Mobile Broadcast Services, Approved Version 1.0—Feb. 12, 2009”, OMA-TS-BCAST_SvcCntProtection-V1_0-20090212-A, Feb. 12, 2009, 270 pp.

Open Mobile Alliance Ltd., “Service Guide for Mobile Broadcast Services, Approved Version 1.0—Feb. 12, 2009”, OMA-TS-BCAST_Service_Guide-V1_0-20090212-A, Feb. 12, 2009, 232 pp.

* cited by examiner

NOISE SUPPRESSING METHOD AND A NOISE SUPPRESSOR FOR APPLYING THE NOISE SUPPRESSING METHOD

CROSS REFERENCE TO RELATED APPLICATION

This application is a 35 U.S.C. §371 national stage application of PCT International Application No. PCT/SE2010/051493, filed on 29 Dec. 2010, the disclosure and content of which is incorporated by reference herein in its entirety. The above-referenced PCT International Application was published in the English language as International Publication No. WO 2012/091643 A1 on 5 Jul. 2012.

TECHNICAL FIELD

The present document relates to a method for suppressing noise and a noise suppressor suitable for executing the suggested noise suppression method.

BACKGROUND

In general terms voice communication can be said to involve the transmission of a near-end speech signal to a far-end or distant user, where a speech enhancement problem consists in the estimation of a relatively clean speech signal from a captured noisy signal. There are a number of single-microphone configurations which allow for improvements when considering the suppression of noise.

Use of two distinct microphones to simultaneously capture a sound field allows for a possible usage of spatial information and characteristics of the sound source(s) from which a sound field captured by the microphones originates. These characteristics may relate to the relative placement of the microphones on a mobile communication device as well as the design and usage of the communication device. A proper estimation of the noise characteristics forms a basis for an efficient use of noise suppression algorithms, such as e.g. algorithms which are based on spectral subtraction, which is commonly used in this particular technical field.

Different methods for executing dual-microphone noise suppression have been suggested based on the assumption that the signals received by the microphones have a relatively similar power level for the near-end signal generated by the user of the communication device.

In WO 2007/059255 noise suppression is performed by generating a ratio of power difference and sum signals from input signals captured by two microphones, after which the input signals are being processed such as to suppress the estimated noise from one of the two input signals.

A drawback with WO 2007/059255, which is relying on the assumption of small or even no gain difference between signals captured by a microphone pair is that, in practice, dual-microphones mounted side-by-side on mobile devices will present an arbitrary gain difference. This difference is both inherent to the high variation of the manufactured microphone gains and to the variation in the near-field signal received levels with small changes in the position of the mobile device relative to the speaker's mouth, when the device is used in handheld mode.

Other methods, such as e.g. the one presented in US 2007/0154031 exploit the level differences between received microphone signals to discriminate speech and noise in the time-frequency domain and to suppress the noise accordingly.

However, while the use of a microphone for capturing noise, typically referred to as a reference microphone, in conjunction with a microphone used for capturing basically speech, typically referred to as a primary microphone, and the exploitation of a resulting signal level difference at the two microphones can allow for a fairly good detection of the speech and noise signals in the time-frequency domain, noise suppression based on a masking approach, such as the one described in US 2007/0154031 normally results in a high distortion of the extracted speech signal and introduces also often musical noise.

A spectral subtraction based method applicable for dual-microphone noise suppression has been suggested in WO2000/062579, where spectral processors are used for producing separate noise reduced and noise estimated signals.

Spectral subtraction techniques, such as the one described in WO2000/062579, have generally proven to be relatively robust to speech cancellation and to provide a relatively good suppression of stationary noise. The filtering process which is normally used in association with spectral subtraction usually relies on estimates of the spectrum of the noise and the spectrum of the noisy speech. The noise spectrum is preferably estimated during speech pauses and is based on the estimation of the stationary part of the noise only. Many background noise environments, such as e.g. restaurants, airports, streets and other public places, are however characterized by the presence of a high level of non-stationary noise which is not taken into consideration in known implementations, which are based on spectral subtraction techniques, and hence when applying these techniques the non-stationary noise component remains unfiltered in the signal transmitted to the far-end user of the communication link.

SUMMARY

It is an object of the invention to address at least some of the problems outlined above. In particular, it is an object of the invention to provide a method for suppressing noise captured by two or more microphones, and a noise suppressor for executing the suggested method.

According to one aspect, a method is provided for suppressing noise of a first signal captured via a primary microphone in a communication device, where the primary microphone is arranged on the communication device such that it is capable of capturing noise and intermittent speech, the noise suppression being executed by processing the first signal and a second signal captured via a reference microphone, arranged on the communication device such that it is capable of capturing noise at substantially the same signal level as the primary microphone and speech at a lower signal level than the primary microphone.

The method comprises a step for determining whether the first signal comprises non-stationary signal components or substantially stationary noise. In case it is determined that the first signal comprises non-stationary signal components it is determined whether the first signal comprises substantially far-field noise.

If, in the previous step, it is determined that the first signal is considered to comprise substantially stationary noise, a noise power spectrum estimate of the first signal is updated with a stationary noise power spectrum estimate, while, if instead the first signal is considered to comprise substantially far-field noise the first signal is updated with a far-field noise power spectrum estimate.

A frequency response is then computed on the basis of the estimated noise power spectrum, and noise is suppressed from the first signal by applying the frequency response on the first signal.

The suggested method is an improved noise suppression method which is especially adapted to suppress noise comprising stationary as well as non-stationary noise.

The mentioned steps are typically repeated on a time frame basis, such that frequency suppression can always be executed on the basis of the present nature of the noise.

The step of determining whether the first signal comprises non-stationary signal components or substantially stationary noise may be achieved by evaluating the difference between the power spectrum of the first signal determined for a specific time frame and an average power spectrum of the first signal, and by determining that the first signal is a non-stationary signal in case the evaluated difference exceeds a predefined threshold.

Typically the method comprises an updating procedure involving a calculation of a signal power spectrum ratio, which is defined as the ratio of a first power spectrum estimated for the first signal, and a second power spectrum estimated for the second signal, and an updating of an inter-microphone gain offset on the basis of the calculated power spectrum ratio in case it is determined that the power spectrum ratio was calculated when the first signal was considered to comprise substantially stationary noise, or a determination of whether the first signal comprises substantially far-field noise by comparing the calculated power spectrum ratio to the previously updated inter-microphone gain offset, in case it is determined that the power spectrum ratio was calculated when the first signal was considered to comprise non-stationary signal components.

By updating the inter-microphone gain offset upon detecting the absence of non-stationary signal components in the first signal, inherent gain differences between the first and the second microphone can be compensated for without need for any calibration of the microphone. According to the suggested method, the first signal may be considered to comprise substantially far-field noise in case it is determined that the updated inter-microphone gain offset exceeds the power spectrum ratio with a predefined margin.

The updating of the inter-microphone gain offset may be performed incrementally, i.e. by incrementally increasing or decreasing the most recently calculated inter-microphone gain offset with a pre-defined value on the basis of the most recently calculated power spectrum ratio, such that a smoother adaptation is obtained.

According to an alternative embodiment, the method may be applied on a communication device which is provided with two or more primary microphones and/or two or more reference microphones.

In the latter case the method steps described above are repeated for at least one more combination of a primary and a reference microphone of the microphones. In addition, one of the primary microphones is selected as a dominant primary microphone, and noise is then suppressed from the signal captured by the selected dominant primary microphone.

By repeating the calculation of the power spectrum ratio and the updating of the inter-microphone gain offset for each combination of microphones, the accuracy of the suggested suppression method may be further improved.

The noise suppression typically comprises the step of calculating a filter transfer function on the basis of a spectral subtraction filter.

According to one embodiment a minimum gain may be applied on the filter, while according to another embodiment, different minimum gains may instead be applied on the filter, wherein such different gains are applicable dependent on whether the first signal is considered to comprise substantially far-field noise or substantially stationary noise, respectively.

The noise suppression typically comprises a step of calculating filtering coefficients of the filter on the basis of any of a minimum phase method or a linear phase method.

According to another aspect a noise suppressor for suppressing noise of a first signal captured via a primary microphone by processing the first signal and a second signal captured via a reference microphone, wherein the two microphones are arranged as suggested for the method described above, is provided.

The noise suppressor comprises a signal stationarity evaluating unit which is configured to determine whether the first signal comprises non-stationary signal components or substantially stationary noise and a far-field signal evaluator which is configured to determine whether the first signal comprises substantially far-field noise, in case it has been determined by the signal stationarity evaluating unit that the first signal comprises non-stationary signal components.

The noise suppressor also comprises a noise power spectrum estimator which is configured to update a noise power spectrum estimate of the first signal with a stationary noise power spectrum estimate, in case it has been considered by the signal stationarity evaluating unit that the first signal comprise substantially stationary noise, or a far-field noise power spectrum estimate, in case it has been considered that the first signal comprise substantially far-field noise.

In addition, the noise suppressor comprises a filtering unit configured to compute a frequency response on the basis of the estimated noise power spectrum, and to suppress noise from the first signal by applying said frequency response on the first signal.

The signal stationarity evaluator, the far-field signal evaluator, the noise power spectrum estimator and the filter are typically configured to execute the signal processing repeatedly on a time frame basis.

The signal stationarity evaluator is configured to determine whether the first signal comprises non-stationary signal components or substantially stationary noise by evaluating the difference between the power spectrum of the first signal determined for a specific time frame and an average power spectrum of the first signal and by determining that the first signal is a non-stationary signal in case the difference exceeds a predefined threshold.

The noise suppressor also comprises a power spectrum calculating unit which is configured to calculate a signal power spectrum ratio, and an inter-microphone gain offset calculator configured to update an inter-microphone gain offset on the basis of the calculated power spectrum ratio, in case it is determined by the signal stationarity evaluator that the power spectrum ratio was calculated when the first signal was considered to comprise substantially stationary noise, and a far-field estimating unit configured to determine whether the first signal comprises substantially far-field noise by comparing the calculated power spectrum to the updated inter-microphone gain offset in case it is determined by the signal stationarity evaluator that the power spectrum ratio was calculated when the first signal was considered to comprise non-stationary signal components.

The far-field estimating unit may be configured to consider the first signal to comprise substantially far-field noise in case it is instructed by the inter-microphone gain offset calculating unit that the inter-microphone gain offset exceeds the power spectrum ratio provided from the power ratio calculating unit with a predefined margin.

The inter-microphone gain offset calculator may be configured to update the inter-microphone gain offset incrementally, i.e. by incrementally increasing or decreasing the most recently calculated inter-microphone gain offset with a predefined value on the basis of the most recently calculated power spectrum ratio.

Alternatively, the noise suppressor may be provided with two or more primary microphones and/or two or more reference microphones, wherein the power ratio calculating unit and the inter-microphone gain offset calculator are configured to repeat the respective calculations for at least one additional combination of a primary and a reference microphone of the microphones.

In addition, the noise suppressor may comprise a selecting unit which is configured to select one of the primary microphones as a dominant primary microphone and to provide the signal of the selected dominant microphone to the filtering unit for noise suppression.

The filtering unit may be configured to calculate a filter transfer function on the basis of a spectral subtraction filter.

In addition, the filtering unit may be configured to apply a minimum gain on the filter. Alternatively, the filtering unit may be configured to apply different minimum gains on the filter, depending on whether the first signal was considered by the stationary estimating unit and the far-field estimating unit to comprise substantially far-field noise or substantially stationary noise.

Further details and examples relating to the embodiments described above will now be described in further detail below.

BRIEF DESCRIPTION OF THE DRAWINGS

Objects, advantages and effects as well as features of the invention will be more readily understood from the following detailed description of exemplary embodiments of the invention when read together with the accompanying drawings, in which.

DETAILED DESCRIPTION

Figure 1:
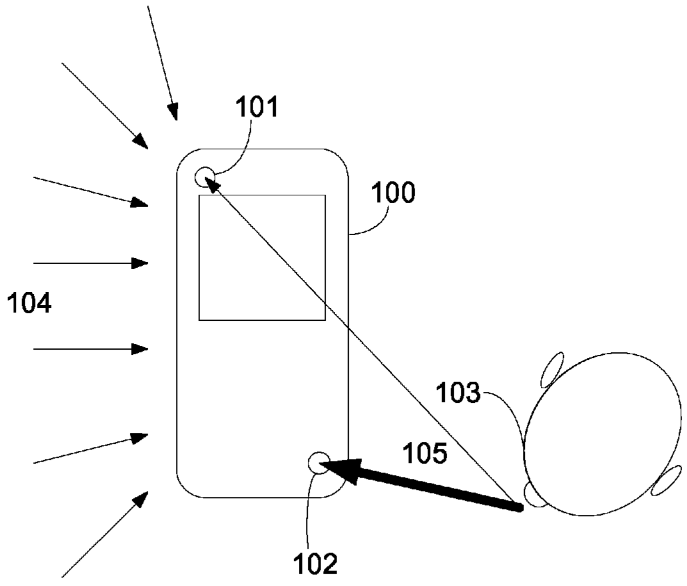
FIG. 1 is a simplified illustration of a scenario where a user is using a communication device which is configured to capture speech and noise via two microphones.

While the invention covers various modifications and alternative constructions, some embodiments of the invention are shown in the drawings and will hereinafter be described in detail. However it is to be understood that the description and drawings are not intended to limit the invention to the specific forms disclosed therein. On the contrary, it is intended that the scope of the claimed invention includes all modifications and alternative constructions thereof falling within the spirit and scope of the invention as expressed in the appended claims.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part using both hardware and software, and that several "units" or "devices" may be represented by the same item of hardware.

The present document suggests a method for suppressing noise from a signal comprising intermittent near-field speech, wherein the signal is captured by a noise suppressor, which is especially suitable for suppressing far-field noise. The expression near-field can in the field of acoustics be defined as a region of space around a sound source which is extending within a fraction of a wavelength away from the sound source, which is commonly considered to be in the order of approximately one meter. Also from a listener's perspective the near-field region is the region of space within one meter of the center of the listener's head or of a microphone capturing the sound field. Accordingly, the far-field is defined as the region beyond this boundary.

This document also describes a noise suppressor which can be referred to as a dual- or multi-microphone far-field noise suppressor which is suitable for implementation on any type of communication device which is configured to capture speech from a user and which can be used for executing a noise suppression method such as the one mentioned above.

A microphone input signal captured by the primary microphone, here referred to as x(t), may be defined as a signal consisting of a speech s(t) component and a noise n(t) component, such that:

$$x(t)=s(t)+n(t) \tag{1}$$

where the noise component in turn can be considered as consisting of a stationary component $n^{stat}(t)$ and a non-stationary component $n^{nonstat}(t)$, such that:

$$n(t)=n^{stat}(t)+n^{nonstat}(t) \tag{2}$$

A frequency response H(f) of a noise suppression filter using spectral subtraction technique can be defined as:

$$H(f) = 1 - \delta\frac{\Phi_n(f)}{\Phi_x(f)} \tag{3}$$

where $\Phi_n(f)$ is the noise power spectrum estimate and $\Phi_x(f)$ is the estimate of the noisy speech power spectrum of the primary signal. The parameter δ is an over-subtraction factor, which allows for emphasis or de-emphasis of the noise power spectrum estimate. A typical value for δ may be e.g. 1,2.

The frequency response can be transformed to a time domain FIR filter using an Inverse Fast Fourier Transform (IFFT) following:

$$H(f)\xrightarrow{IFFT}h(z) \tag{4}$$

If the obtained time domain filter h(z) is applied to the noisy speech signal x(t) an output signal y(t) from which noise has been suppressed, can be obtained, such that:

$$y(t)=h(z)\Theta x(t) \tag{5}$$

where Θ is to the convolution operator.

While the noisy speech power spectrum $\Phi_x(f)$ of the frequency response can be calculated based on the available input signal x(t), the noise power spectrum $\Phi_n(f)$ is commonly estimated during speech pauses. For that purpose, detection of speech activity can be based on a continuous measure of the stationarity of the received signal <!!>. Hence, the noise spectrum estimation relies on an estimation of the stationary part of the noise only.

An estimation of the stationary noise power spectrum $\Phi_n^{stat}(f)$ can be obtained using the Fast Fourier Transform (FFT) of x(t) when x(t) is considered to be a stationary signal, which may be expressed as:

$$x(t) \xrightarrow{FFT} X(f) \approx N(f) \longrightarrow \Phi_n^{stat}(f) \tag{6}$$

In order to improve the performance of the spectral subtraction technique, a better estimate of the noise spectrum than simply relying on the detection of stationary noise is required. The objective is hence to distinguish far-field noise from near-field speech when non-stationarity of the signal impinging on the primary microphone is confirmed.

The suggested noise suppression method is based on the use of at least one microphone pair for capturing near-field speech and surrounding far-field noise. In the present context a microphone pair is considered to consist of a first microphone, from hereinafter referred to as a primary microphone, arranged on the communication device such that it is located relatively close to a speaker mouth when the communication device is held in a normal conversation position, and capable of capturing noise and intermittent speech, and a second microphone, from hereinafter referred to as a reference microphone, arranged on the communication device at a location further away from a user mouth when the communication device is held or placed in a normal conversation position, such that it is capable of capturing intermittent speech at a lower signal level than the primary microphone and noise. Consequently, the location of the respective microphones in relation to the user's mouth determines how well they will be able to capture distinguishable signals.

Typically the suggested suppression method is adapted for use on a portable handheld communication device, such as e.g. a mobile telephone, but any type of communication device, including a stationary communication device, which allows at least two microphones to be placed on the communication device such that the condition described above can be fulfilled will be applicable.

By arranging two microphones constituting a microphone pair as described above, processing means, which will be described in further detail below, connected to the two microphones can be used for estimating far-field noise in the absence of near-field speech, based on the received input signals.

If more than one primary microphone and/or reference microphone is used, each primary microphone may form a respective microphone pair by combining the primary microphone with anything from one up to each reference microphone and vice versa, i.e. any combination(s) may be applied as long as a respective combination refers to a first microphone operable as a primary microphone and a second microphone operable as a reference microphone, and in order to perform a better noise suppression the suggested processing can be performed for each defined microphone pair.

A distinction between a far-field signal, which is considered to be substantially represented by far-field noise and a near-field signal, is, according to the suggested method, accomplished by making a comparison of an inter-microphone power ratio, and the gain offset of the microphone pair in the frequency domain, after having determined that the primary signal comprises non-stationary signal components.

A spectral subtraction algorithm which has been adapted to consider stationary, as well as non-stationary noise is then used for enabling dynamic suppression of the far-field noise from the primary microphone signal on the basis of the type of sound source, i.e. stationary noise, near-field speech or far-field noise, identified in the time-frequency domain.

Spectral subtraction basically relies on a design of a desired frequency response of a noise suppressing filter, which is typically based on an estimate of the spectrum of the noise and the noisy speech of a captured signal. While a noisy speech spectrum can be obtained from the input data of the primary microphone, the noise spectrum is estimated during speech and consists of an estimate of the stationary part of the noise only.

One way of improving the performance of the spectral suppression algorithms is to include the detection and suppression of non-stationary far-field noise in addition to stationary noise by improving the identification of the type of sound sources which are found to be active in the time-frequency domain.

An objective is hence to distinguish captured far-field noise from near-field speech on occasions when non-stationarity of the signal impinging on the primary microphone is confirmed. The process for making such a distinction, which will be described in further detail below, detects the presence of far-field noise in the absence of near-field speech in the frequency domain and provides this information to a noise suppressor for processing.

FIG. 1 is a simplified illustration of a communication device, which in the present case is a mobile telephone 100, comprising one reference microphone 101 arranged at a distant location from a primary microphone 102, where the later is located close to a user's mouth 103. By arranging the reference microphone 101 and the primary microphone 102 separate from each other on the mobile telephone 100, and at different distances to a speaker's mouth 103, signals originating from the surroundings, near the user, here referred to as near-field signals 105, as well as far from the mobile telephone 100, here referred to as far-field signals 104, will be distinguishable by processing signals captured by the two microphones according to the method mentioned above.

Due to its location, the reference microphone 101 will pick up near-field speech 105 at a considerably lower level than the "near-mouth" primary microphone 102, while, due to the relatively small dimensions of mobile telephones as well as other communication devices, and thus small distances between a respective microphone pair, far-field noise 104 is received basically with similar power levels at both microphones.

Since the nature of speech is intermittent, i.e. silent periods are interrupted by periods of speech, while at the same time the nature of surrounding noise vary, the ability to adapt to such changes will affect how effective the noise suppression can be. The suggested method is especially suitable for efficiently adapt to such changes.

Another way of obtaining improved accuracy in the noise suppression method is to provide the mobile telephone 100 with three or more microphones arranged on the mobile telephone 100 at different locations, in such a way that the signal processing can be based on inputs from more than one microphone-pair.

A method for suppressing noise which is especially suitable for suppressing far-field noise captured by a communication device will now be described in further detail with reference to FIG. 2. The suggested method is executable as an iterative process which is typically repeated for each time frame of a signal for which the noise is to be suppressed.

In a first step 200, a first signal, from hereinafter referred to as a primary signal, is captured by a primary microphone, which is located on a communication device in close vicinity to a user's mouth, such that the captured primary signal will comprise intermittent speech and noise. In addition, a second signal, from hereinafter referred to as a reference signal, is captured by a reference microphone located on the communication device, such that the reference signal comprises speech at a signal level which is lower than for the primary signal, while the noise captured by both microphones will be of comparable signal levels.

Typically the reference microphone is also arranged in a direction which is different from the direction of the primary microphone, such that while the primary microphone is arranged in a direction so chosen that it efficiently captures speech of a talking person in the near-field of the communication device, the reference microphone is arranged in a direction such that it efficiently captures a sound field originating from other sound sources located in the far-field of the device.

The two captured signals are then processed such that a respective signal power spectrum $P_{prim}(f)$ and $P_{ref}(f)$ of the two captured signals are estimated, as indicated in a second step 210. In a subsequent step 220 the power spectrum ratio, $R_p(f)$, of the two signals is calculated and stored, such that:

$$R_p(f) = \frac{P_{prim}(f)}{P_{ref}(f)} \tag{7}$$

where $P_{prim}(f)$ is the power spectrum of the primary microphone and $P_{ref}(f)$ is the power spectrum of the reference microphone.

If more than one primary microphone or more than one reference microphone is used to provide input signals, a signal power spectrum ratio is calculated for each defined microphone pair in step 220. In addition, in case more than one primary microphone is used, one of these primary microphones is selected in optional step 230 as the microphone from which the signal is to be filtered from noise. From hereinafter the selected primary microphone is to be referred to as the dominant primary microphone. The dominant primary microphone may be selected by choosing the microphone providing the biggest relative signal difference with a reference microphone signal after having subtracted the effect of the inter-microphone gain offset.

In a further step 240 it is determined whether the primary signal can be considered to comprise non-stationary signal components or if the signal comprises substantially stationary noise. The type of noise may typically be determined by evaluating how much the signal power spectrum $\Phi_{x,k}(f)$ of the primary signal for a respective time frame k differs from its long term average value. This can be determined by comparing the ratio of the signal power spectrum $\Phi_{x,k}(f)$ by its long term average value to a predetermined threshold. If the ratio exceeds the threshold, the signal is considered to be non-stationary.

If in step 240 it is determined that the primary signal comprises substantially stationary noise, the signal power spectrum ratio calculated in step 220 is used for updating an inter-microphone gain offset G(f), as indicated with a step 250*a*. G(f) can be defined as:

$$G(f) = \frac{P_{prim}^{stat}(f)}{P_{ref}^{stat}(f)} \tag{8}$$

Here $P_{prim}^{stat}(f)$ is the power spectrum of the primary microphone signal while $P_{ref}^{stat}(f)$ is the power spectrum of the reference microphone signal. The gain difference between the microphone received signals is continuously updated such as to account for variations in microphone gains due to the individual microphone characteristics, as well as to variations in received signal levels due to the movement of the communication device relative the speaker's mouth during use in handheld mode.

Obviously the gain offset is obtained by using the most recently calculated power spectrum ratio in case the primary signal was found to be a stationary signal. Instead of considering a static gain offset as is typically done in known noise suppression processing, the gain offset is thus dynamically adapted to the sound field captured by the microphone pair. In a typical scenario, the inter-microphone gain offset is incrementally updated in order to obtain a smoother change, wherein the previously updated inter-microphone gain offset is incrementally increased or decreased with a pre-defined value on the basis of the most recently calculated power spectrum ratio. The detection of the frequency bands where the gain offset should be decreased or increased is done by comparing the power spectrum ratio calculated in step 220 to a previously estimated gain offset.

If more than two microphones are used, an inter-microphone gain offset is updated for each microphone pair.

Also, if in step 240 it was determined that the primary signal comprises substantially stationary noise, the stationary-noise power spectrum of the primary microphone $\Phi_n^{stat}(f)$, or the dominant primary microphone if more than one primary microphone is used, is estimated, as indicated with step 260*a*.

If instead it is considered in step 240 that the primary signal comprises non-stationary signal components, it is determined in a subsequent step whether or not the non-stationary signal comprises substantially far-field noise, as indicated with a subsequent step 250*b*. If in step 250*b* it is determined that the first signal comprises substantially far-field noise, a far-field noise power spectrum is estimated for the respective time frame, as indicated in a subsequent step 260*b*.

A distinction between far-field and near-field signals in the frequency domain, i.e. for each frequency band centered around frequency f, i.e. execution of step 250*b*, can be accomplished by executing a comparison of the inter-microphone power ratio and the gain offset in the frequency domain for a respective evaluated time frame such that, if $$R_p(f) < \beta G(f) \tag{9}$$

then the primary signal is considered to be a far-field signal, i.e. far-field noise is solely present at the primary signal. Here β is a factor providing a margin for calculation errors, which may e.g. be selected as β=2, which corresponds to a 3 dB margin.

In case more than one microphone pair is used, the decision concerning the presence of far-field noise can be improved by combining the decisions made in step 250*b* based on the different applied microphone pairs. One way to perform such a combined decision is to average the decisions for all microphone pairs for each frequency band.

As indicated above, only under specified conditions will a far-field noise power spectrum or a stationary noise power spectrum be updated, i.e. depending on the type of noise determined during a respective time frame, the respective noise power spectrum is updated for that time frame.

This means that for each new time frame the power spectrum on which the frequency response is to be derived is updated in order to adapt to the present type of noise. However, if in step 250*b* it was determined that basically no far-field noise was present in the first signal, i.e. the primary signal is considered to comprise near-field speech, then the noise power spectrum update process in step 270, is executed on the basis of the previously updated stationary noise power spectrum.

The estimate of the noise power spectrum of the primary microphone, or the dominant primary microphone, for time frame k can be defined as:

$$\Phi_{n,k}(f)=\lambda\Phi_{n,k-1}(f)+(1-\lambda)((1-D^{nonstat})\Phi_n^{stat}(f)+D^{nonstat}\Phi_n^{nonstat}(f)) \quad (10)$$

Here the updated noise power spectrum at time frame k is a function of the noise spectrum calculated at the previous time frame (k−1), as well as the estimated stationary noise power spectrum and the far-field noise power spectrum for time frame k. The parameter λ is a positive decay factor smaller that unity, which may e.g. be set to 0.9.

Figure 2:
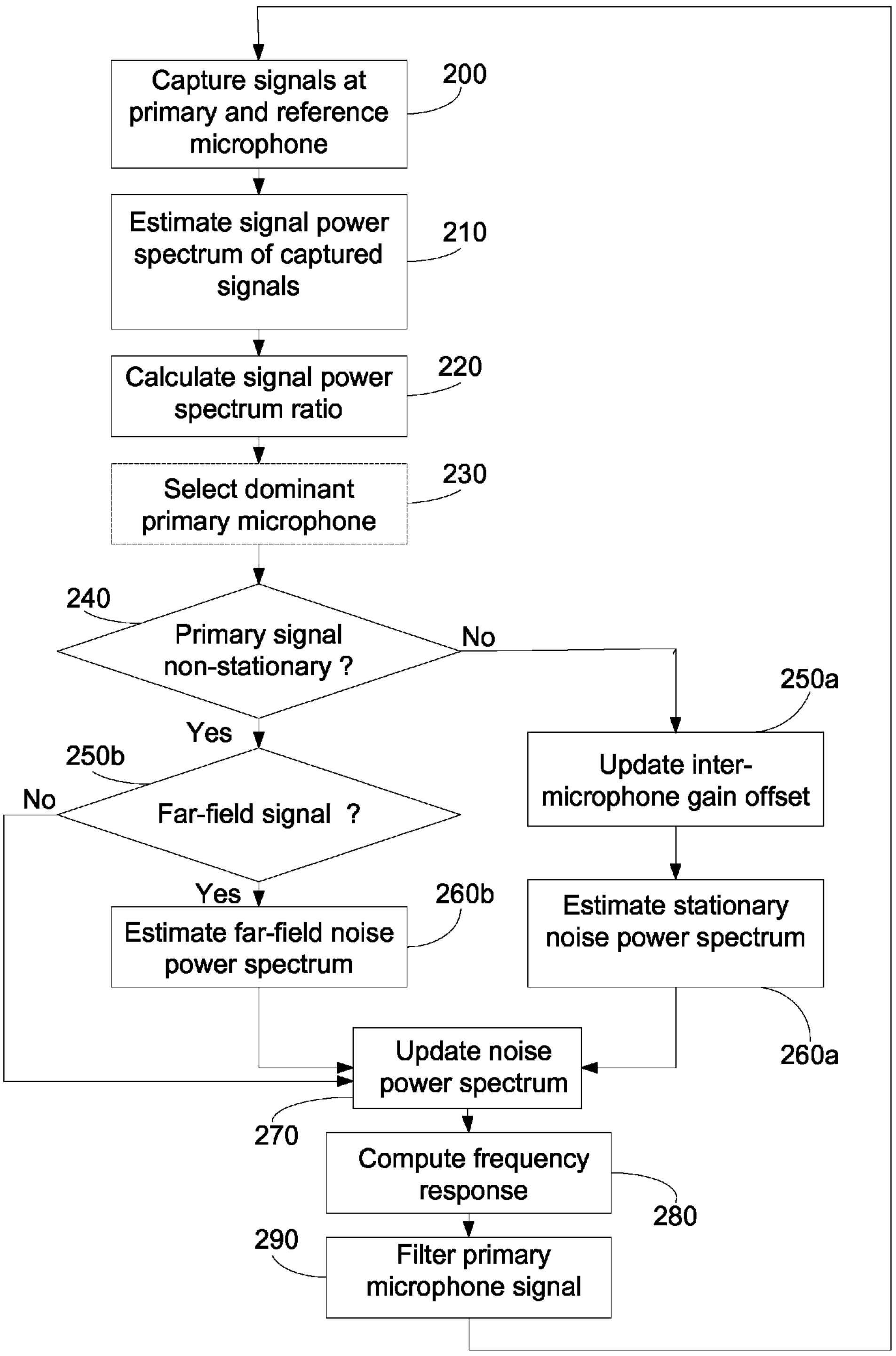
FIG. 2 is a simplified flow chart illustrating a method for suppressing noise captured via at least two microphones.

The parameter $D^{nonstat}$ is based on the decision on the presence of near-field non-stationary signal in the primary signal, made in step 240 of FIG. 2. For a respective time frame, parameter $D^{nonstat}$ is set to one if far-field noise is considered to be substantially present in the primary microphone or to zero if near-field speech is considered to be present in the primary microphone.

In a step 280 a frequency response is computed on the basis of the noise power spectrum, which has been updated as indicated above.

In another step 290 the primary signal is fed to a filtering unit, where the frequency response is applied to the primary signal such that noise is efficiently suppressed from the primary signal.

As already mentioned above, as an alternative to using one microphone pair, the method may be based on the input from a plurality of microphones. By using a plurality of input signals, and by selecting the most representative signal at each time instance, more efficient noise suppression may be obtained. The primary signal captured by the microphone appointed as the most dominant microphone is then used as the signal to be filtered in step 290.

The filtering may be achieved by calculating a filter transfer function which is based on a spectral subtraction filter.

The noise power spectrum is used to calculate the frequency response of the spectral subtraction, $H_k^{spect}(f)$, for each time frame k and filter the input signal accordingly, as:

$$H_k^{spect}(f) = 1 - \delta\frac{\Phi_{n,k}(f)}{\Phi_{x,k}(f)} \quad (11)$$

In practice, due to the random nature of the noise and its inaccurate estimation, the frequency response of equation (11) may not always be positive. Therefore, spectral subtraction techniques usually apply a threshold that may either be set at an absolute floor level or as a small fraction of the power spectrum of the noisy speech signal. It follows that the frequency response of the noise suppressor is adjusted to a desired maximum attenuation level $H_{min}(f)$, such that a resulting frequency response $H_k(f)$ for time frame k can be expressed as:

$$H_k(f)=\max\lfloor H_k^{spect}(f),H_{min}(f)\rfloor \quad (12)$$

Here the desired maximum attenuation level can be designed to be a function of the decisions on the substantial presence of stationary noise, $D^{stat}$, or far-field noise, $D^{nonstat}$, determined in step 240 and 250*b*, respectively, as:

$$H_{min}(f)=\Im(D^{stat},D^{nonstat}) \quad (13)$$

The frequency response computation according to step 280 typically includes the determination of a maximum attenuation yield, for the frequency response. As already indicated above, such a maximum attenuation yield may be achieved by applying a minimum gain, which limits the frequency band to be considered on the filter.

According to one embodiment, one and the same minimum gain may be selected, irrespective of whether the noise is found to be of a stationary or far-field nature.

According to another embodiment, different minimum gains may be applied depending on the determined stationarity of the primary signal. One such realization is given by the calculation of the minimum gain according to:

$$H_{min}(f) = \max\left[\min\left[1-\delta\frac{\Phi_{n,k}^{stat}(f)}{\Phi_{x,k}(f)}, H_{min}^{nonstat}(f)\right], H_{min}^{stat}(f)\right] \quad (14)$$

where $H_{min}^{stat}(f)$ is the minimum gain applied for the suppression of stationary noise and $H_{min}^{nonstat}(f)$) is the minimum gain applied for suppression of far-field noise when considered that the far-field noise comprises non-stationary noise.

The filtering coefficients applied by the filtering process may typically be calculated on the basis of any of a minimum phase method or a linear phase method.

The method described above is suitable to apply on any type of communication device which is configured to capture speech via at least one primary microphone and where at least one second reference microphone can be implemented on the device at a location distant from the primary microphone. Such a communication device may typically be a cellular telephone, where the microphones constituting a microphone pair are preferably, but not necessarily, located on opposite ends of the communication device.

A noise attenuator which is suitable for executing a noise attenuation method such as the one described above with reference to FIG. 2 when implemented on a communication device will now be described in more detail with reference to FIG. 3.

Figure 3:
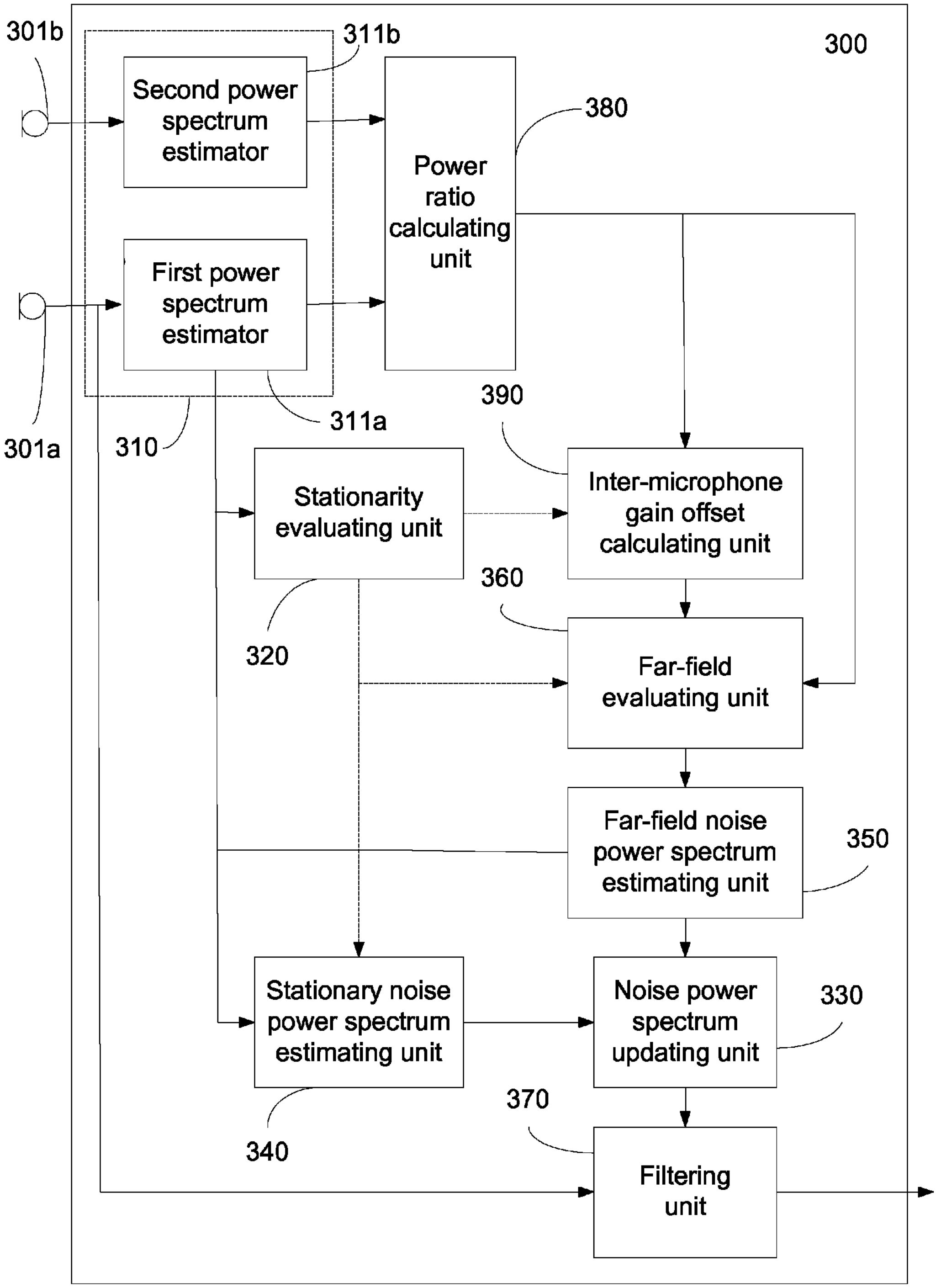
FIG. 3 is a simplified block scheme of a noise suppressor configured to suppress noise captured via two microphones.

The noise suppressor 300 of FIG. 3 comprises a power spectrum estimating unit 310 configured for a specific number of microphones. Accordingly, for a configuration suitable for one microphone pair, as indicated in FIG. 3, the power spectrum estimating unit 310 comprises a first power spectrum estimator 311*a* which is configured to estimate a power spectrum of a primary signal, captured by a primary microphone 301*a* and a second power spectrum estimator 311*b*, which is configured to estimate a power spectrum of a reference signal captured by a reference microphone 301*b*.

A stationarity evaluating unit 320 connected to the first power spectrum estimator 311*a*, is configured to determine whether a primary signal comprises non-stationary signal components or substantially stationary noise. A far-field evaluating unit 360 is configured to determine whether the primary signal comprises substantially far-field noise in case it was determined by the stationary evaluating unit 320 that the primary signal comprises non-stationary signal components. Consequently, the far-field evaluating unit 360 is triggered by the stationary evaluating unit 320 by presence of non-stationary signal components in the primary signal. As mentioned above, the stationarity evaluating unit 320 may typically be configured to compare the power spectrum, which is accessible from the first power spectrum estimator 311*a*, with its long term average.

The noise attenuator 300 of FIG. 3 also comprises a noise power spectrum estimating unit 330 which is configured to update a noise power spectrum of the primary signal on the basis of a respective power spectrum estimate i.e. if an input signal is provided from any of a stationary noise power spectrum estimating unit 340, which is configured to estimate the stationary noise power spectrum of the primary signal, or a far-field noise power spectrum estimating unit 350, which is configured to estimate the far-field noise power spectrum of the primary signal. Which input to use by the noise power spectrum updating unit 330 is determined by the stationary evaluating unit 320 and the far-field evaluating unit 360, which, on the basis of the primary signal, or more specifically the power spectrum estimate of the primary signal, is configured to trigger any of the stationary noise power spectrum estimating unit 340 or the far-field noise power spectrum estimating unit 350 for every time frame for which it is determined that the primary signal does not substantially comprise near-field speech.

In case it is determined by the stationary evaluating unit 320 that the primary signal comprises substantially stationary noise the stationary evaluating unit 320 triggers the stationary noise power spectrum estimating unit 340 to provide a stationary noise power spectrum estimate to the noise power spectrum updating unit 330, which is configured to update the noise power spectrum on the basis of this input data. If instead the stationarity evaluating unit 320 determines that the primary signal comprises non-stationary signal components, it is configured to trigger additional functional units to determine whether the signal captured by the primary microphone comprises substantially far-field noise or near-field speech.

The noise suppressor 300 also comprises a functional unit, here referred to as a power ratio calculating unit 380 which is configured to calculate a signal power spectrum ratio, between a first power spectrum, estimated by the first power spectrum estimator 310*a*, and a second power spectrum, estimated by the second power spectrum estimator 310*b*. The power ratio calculating unit 380 is connected to yet another functional unit, referred to as an inter-microphone gain offset calculator 390 which is configured to update an inter-microphone gain offset on the basis of the signal power spectrum ratio of the power ratio calculating unit 380, when triggered by the stationary evaluating unit 320, i.e. when it has been determined by the signal stationary evaluator 320 that the primary signal is to be considered to comprise substantially stationary noise.

The far-field estimating unit 360 mentioned above, is configured to determine whether or not the primary signal comprises substantially far-field noise. In order to be able to make such a determination, the far-field evaluating unit 360 is configured to compare a calculated power spectrum ratio, provided by the power ratio calculating unit 380, to the updated inter-microphone gain offset, provided by the inter-microphone gain offset calculating unit 390 according to equation (9), in case such a process is triggered by the stationary evaluating unit 320, i.e. in case it is determined by the stationary evaluating unit 320 that the primary signal comprises non-stationary signal components.

The inter-microphone gain offset calculating unit 390 may be configured to adapt the inter-microphone gain offset by incrementally increasing or decreasing the most recently calculated inter-microphone gain offset with a pre-defined value on the basis of the most recently calculated power spectrum ratio.

The noise power spectrum estimator 330 is connected to a filtering unit 370 which is configured to compute a frequency response on the basis of the estimated noise power spectrum provided from the noise power spectrum estimator 330, and to filter noise from the first signal by applying the frequency response on the first signal. For each time frame, the noise power spectrum estimator is configured to provide a noise power spectrum estimate to the filtering unit 370

The noise attenuator 300 is configured such that the filtering can be adaptively executed on a time frame basis, i.e. for each time frame of a primary signal, the stationarity is determined by the signal stationary evaluator 320 and on the basis of the result, the filtering unit 370 is updated by the input from the noise power spectrum updating unit 330, such that it can provide an efficient attenuation of the noise of the primary signal which is provided to the filtering unit 370 as indicated in FIG. 3. The filtering unit 370 may be configured to calculate a filter transfer function on the basis of a spectral subtraction filter.

Figure 4:
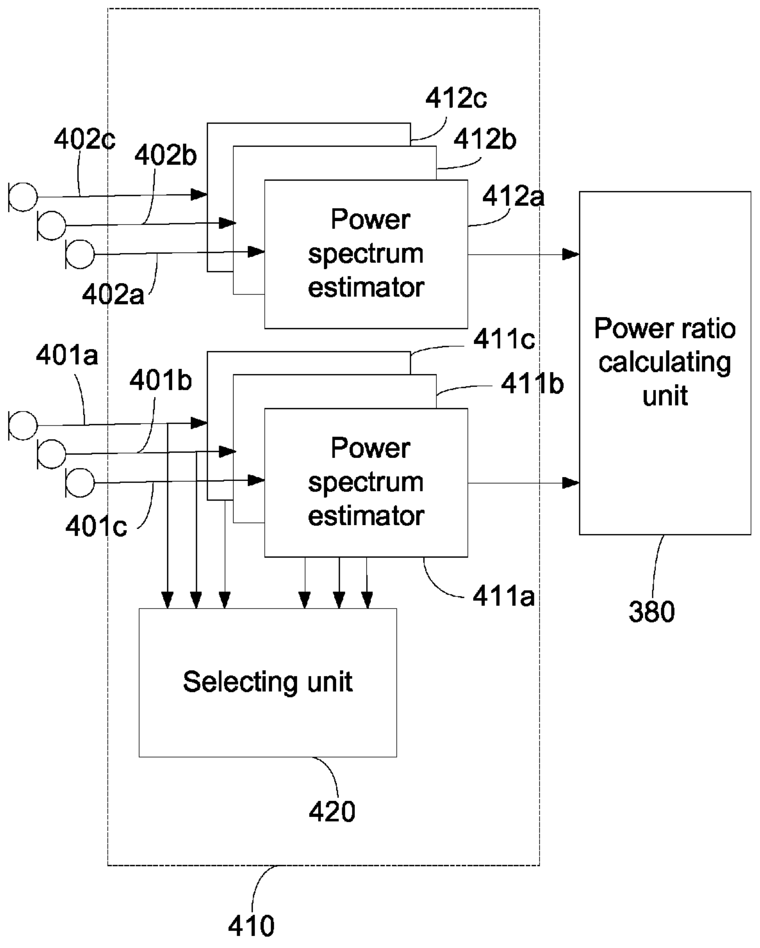
FIG. 4 is another simplified block scheme illustrating a modification of a part of the block scheme of FIG. 3 for enabling capturing of speech and noise via more than two microphones.

FIG. 4 is a block scheme illustrating a part of the noise attenuator according to FIG. 3 where the power spectrum estimator 310 of FIG. 3 has been replaced by an adapted power spectrum estimating unit 410 such that the attenuator can host two or more microphones, while the remaining functionalities of FIG. 3 can remain the same.

FIG. 4 comprises three primary microphones 401*a*, 401*b*, 402*c* where each primary microphone is connected to a separate power spectrum estimator 411*a*, 411*b*, 411, and three reference microphones 402*a*, 402*b*, 402*c*, connected to a respective dedicated power estimating unit 412*a*, 412*b*, 412*c*. In addition, the power spectrum ratio calculating unit 380 and the inter-microphone gain offset calculator 390 (not shown) are configured to repeat the respective calculations for each selected microphone pair. In the present example, up to 9 different microphone pairs may be defined and used for providing input data to the noise suppressor. If e.g. three microphone pairs are defined, the primary microphone 401*a* may e.g. form a microphone pair with reference microphone 402*a*, while microphones 401*b* and 402*b* form a second pair and microphones 401*c* and 402*c* form a third microphone pair, but any possible combinations involving a primary and a reference microphone may be applied.

In addition, the power spectrum estimating unit 410 is provided with a selecting unit 420 which is configured to select one of the primary microphones 401*a*, 401*b*, 401*c* as a dominant primary microphone and to provide the signal of the selected dominant microphone to the filtering unit 370 for filtering.

It is to be understood that the functional units described in FIGS. 3 and 4 are provided with conventional storing functionality such that appropriate updating procedures can be executed on the basis of previous estimations and calculations as well as on average measures, such as the ones mentioned above.

Figure 5:
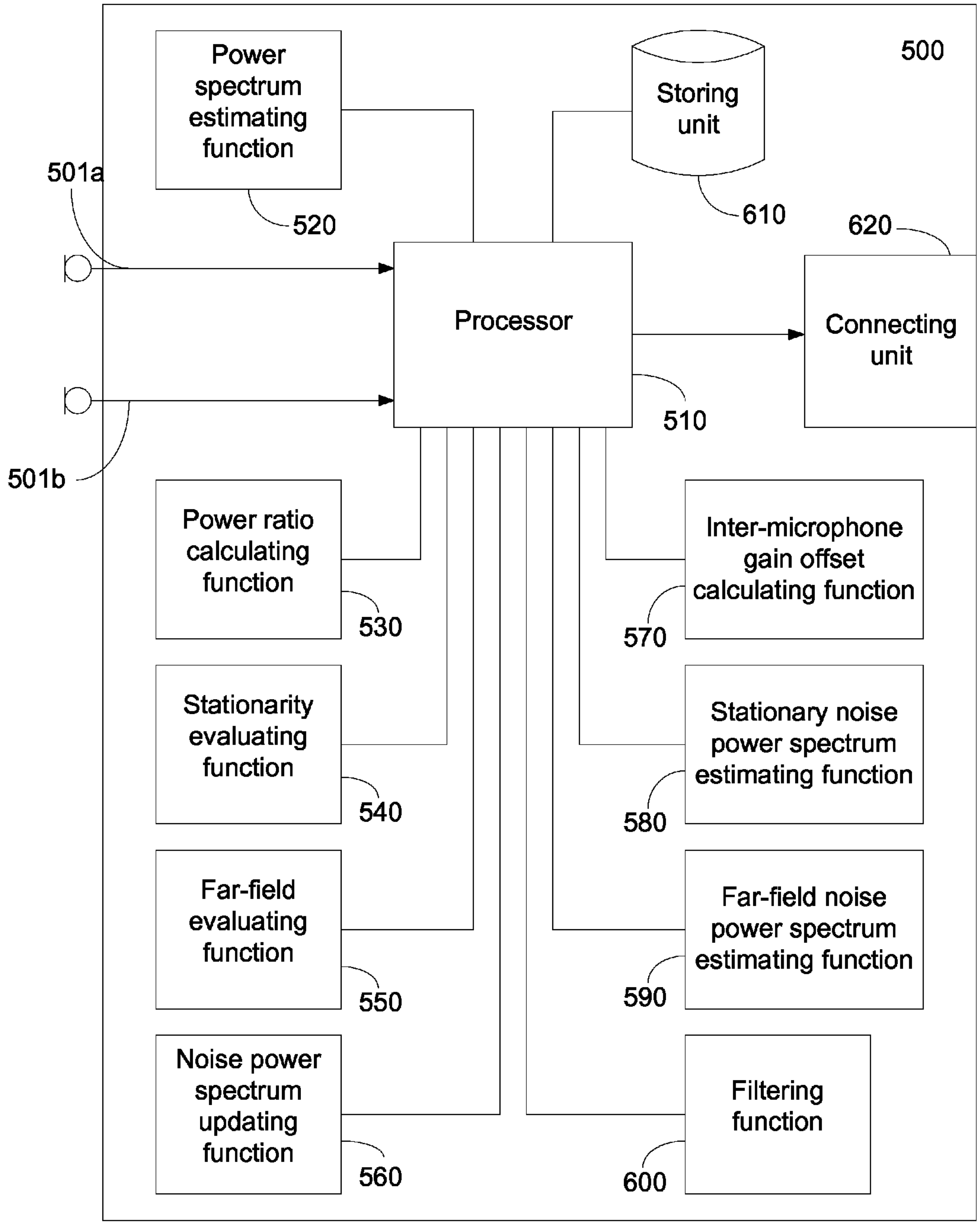
FIG. 5 is a simplified scheme illustrating a software based configuration of a noise suppressor which corresponds to the noise suppressor of FIG. 3.

Moreover, those skilled in the art will appreciate that the units and functions suggested in this document may be implemented using software functioning in conjunction with a programmable special purpose microprocessor or general purpose computer, alone or in combination with an Application Specific Integrated Circuit (ASIC). It will also be appreciated that while the current invention is primarily described in the form of methods and devices, the invention may also be embodied in a computer program as well as a system comprising a computer program stored on a memory and connected to a processor, where the memory may be any of a flash memory, a RAM (Random-access memory), a ROM (Read-Only Memory) or an EEPROM (Electrically Erasable Programmable ROM), A software based noise suppressor according to one embodiment, which is suitable for implementation on a communication device is illustrated in FIG. 5, where a noise suppressor 500 comprises a processor 510 which is configured to execute a noise suppressor method such as the one described above. The noise suppressor 500 of FIG. 5 comprises one microphone pair 501*a*, 502*b*, which, although not shown in simplified FIG. 5 typically may be connected to the processor 500 via some kind of signal processing functionality. The processor is adapted to run a noise suppressing computer program, comprising computer readable code means which when run on a communication device causes the device to execute a method which corresponds to the one described above with reference to FIG. 2. The processor 510 is configured to execute a plurality of functions, which according to the embodiment of FIG. 5 are referred to as a power spectrum estimating function, 520, a power ratio calculating function 530, a stationarity evaluating function 540, a far-field evaluating function 550, a noise power spectrum updating function 560, an inter-microphone gain offset calculating function 570, a stationary noise power spectrum estimating function 580, a far-field noise power spectrum estimating function 590, and a filtering function 600, which when run on the communication device corresponds to the functionality obtained by the power spectrum estimating unit, 310, the power ratio calculating unit 380, the stationarity evaluating unit 320, the far-field evaluating unit 350, the noise power spectrum updating unit 330, the inter-microphone gain offset calculating unit 390, the stationary noise power spectrum estimating unit 340, the far-field noise power spectrum estimating unit 350, and the filtering unit 370, respectively, The noise suppressor 500 also comprises a storing unit 610 and a connecting unit 620 which is configured to connect the filtered primary signal to conventional signal processing functionality (not shown) of the communication unit on which the noise suppressor 500 has been implemented.

It is to be understood that the units and functions described above in association with the respective embodiments represents one way of making the suggested method executable, and that other combinations or units or functions may be alternatively applied as long as the general process as described above can be executed accordingly.

While the invention has been described with reference to specific exemplary embodiments, the description is generally only intended to illustrate the inventive concept and should not be taken as limiting the scope of the invention. The present invention is defined by the appended claims.

The invention claimed is:

1. A method in a communication device for suppressing noise of a first signal, captured via a primary microphone, arranged on the communication device such that it is capable of capturing noise and intermittent speech, the noise suppression being executed by processing signal power spectrum estimates of the first signal and a second signal, captured via a reference microphone arranged on the communication device, such that it is capable of capturing noise at substantially the same signal level as the primary microphone and speech at a lower signal level than the primary microphone, the method comprising:

determining, on the basis of characteristics of the signal power spectrum estimate of the first signal, whether the first signal comprises non-stationary signal components or substantially stationary noise;

responsive to determining that the first signal comprises substantially non-stationary signal components, determining, on the basis of an inter-microphone gain offset and a ratio of the first signal and the second signal, whether the first signal comprises near-field signal components or substantially far-field noise;

responsive to determining that the first signal comprises substantially stationary noise, updating a noise power spectrum estimate of the first signal with a stationary noise power spectrum estimate;

responsive to determining that the first signal comprises substantially far-field noise, updating the noise power spectrum estimate of the first signal with a far-field noise power spectrum estimate;

computing a frequency response of a noise suppressing filter on the basis of the noise power spectrum estimate, suppressing noise from the first signal by applying the noise suppressing filter with said frequency response on said first signal; and calculating a signal power spectrum ratio as a ratio of a first power spectrum estimated for the first signal and a second power spectrum estimated for the second signal, and either responsive to the power spectrum ratio being calculated when the first signal was determined to comprise substantially stationary noise, updating the inter-microphone gain offset on the basis of the signal power spectrum ratio, or responsive to the power spectrum ratio being calculated when the first signal was determined to comprise non-stationary signal components, determining whether the first signal comprises substantially far-field noise by comparing the signal power spectrum ratio to the most recently updated inter-microphone gain offset.

2. The method according to claim 1, comprising:

repeating the method on a time frame basis.

3. The method according to claim 1, wherein the step of determining whether the first signal comprises non-stationary signal components or substantially stationary noise comprises:

evaluating the difference between the power spectrum of the first signal determined for a specific time frame and an average power spectrum of the first signal over a plurality of time frames, and responsive to said difference exceeding a predefined threshold, determining that the first signal is a non-stationary signal.

4. The method according to claim 1, wherein the first signal is determined to comprise substantially far-field noise responsive to the updated inter-microphone gain offset exceeding the signal power spectrum ratio with a predefined margin.

5. The method according to claim 1, wherein the updating the noise power spectrum ratio comprises:

updating the inter-microphone gain offset by incrementally increasing or decreasing the most recently calculated inter-microphone gain offset with a pre-defined value on the basis of the most recently calculated signal power spectrum ratio.

6. The method according to claim 1, wherein the communication device comprises two or more primary microphones and/or two or more reference microphones, the method comprising:

repeating the method for at least one more combination of one of the primary microphones and one of the reference microphones;

selecting one of the primary microphones as a dominant primary microphone, and suppressing noise from the signal captured by the dominant primary microphone.

7. The method according to claim 6, further comprising:

repeating the calculation of the signal power spectrum ratio and the updating of the inter-microphone gain offset for each combination of the primary and reference microphones.

8. The method according to claim 1, wherein the noise suppressing filter comprises a spectral subtraction filter, and the method further comprises calculating a frequency response of the spectral subtraction filter based on the noise power spectrum estimate.

9. The method according to claim 8, comprising:

applying a minimum gain on the spectral subtraction filter.

10. The method according to claim 9, wherein different minimum gains are applied on the spectral subtraction filter depending on whether the first signal is determined to comprise substantially far-field noise or substantially stationary noise.

11. The method according to claim 9, further comprising:

calculating filtering coefficients of the spectral subtraction filter on the basis of any of a minimum phase method or a linear phase method.

12. A noise suppressor for suppressing noise of a first signal, captured via a primary microphone, arranged on a communication device such that it is capable of capturing noise and intermittent speech, the noise suppressor being configured to suppress noise by processing signal power spectrum estimates of the first signal and a second signal, captured via a reference microphone arranged on the communication device such that it is capable of capturing noise at substantially the same signal level as the primary microphone and speech at a lower signal level than the primary microphone, the noise suppressor comprising:

a stationarity evaluating unit configured to determine, on the basis of characteristics of the signal power spectrum estimate of the first signal, whether the first signal comprises non-stationary signal components or substantially stationary noise;

a far-field evaluating unit configured to respond to determining that the first signal comprises substantially non-stationary signal components by determining, on the basis of an inter-microphone gain offset and a ratio of the first signal and the second signal, whether the first signal comprises near-field signal components or substantially far-field noise;

a noise power spectrum updating unit configured to respond to determining that the first signal comprises substantially stationary noise by updating a noise power spectrum estimate of the first signal with a stationary noise power spectrum estimate, the noise power spectrum updating unit is further configured to respond to determining that the first signal comprises substantially far-field noise by updating the noise power spectrum estimate of the first signal with a far-field noise power spectrum estimate;

a filtering unit configured to compute a frequency response of a noise suppressing filter on the basis of the noise power spectrum estimate, and to suppress noise from the first signal by applying the noise suppressing filter with said frequency response on said first signal;

a power ratio calculating unit configured to calculate a signal power spectrum ratio as a ratio of a first power spectrum estimated for the first signal and a second power spectrum estimated for the second signal;

an inter-microphone gain offset calculating unit configured to respond to the power spectrum ratio being calculated when the first signal was determined to comprise substantially stationary noise, by updating the inter-microphone gain offset on the basis of the signal power spectrum ratio, and a far-field noise power spectrum estimating unit configured to respond to the power spectrum ratio being calculated when the first signal was determined to comprise non-stationary signal components by determining whether the first signal comprises substantially far-field noise by comparing the signal power spectrum to the previously updated inter-microphone gain offset.

13. The noise suppressor according to claim 12, wherein the stationarity evaluating unit, the far-field evaluating unit, the noise power spectrum estimating unit and the filtering unit are configured to execute said signal processing repeatedly on a time frame basis.

14. The noise suppressor according to claim 12, wherein the signal stationarity evaluating unit is configured to determine whether the first signal comprises non-stationary signal components or substantially stationary noise by evaluating the difference between the power spectrum of the first signal determined for a specific time frame and an average power spectrum of the first signal over a plurality of time frames and by determining that the first signal is a non-stationary signal responsive to said difference exceeding a predefined threshold.

15. The noise suppressor according to claim 12, wherein the far-field noise power spectrum estimating unit is configured to determine that the first signal comprises substantially far-field noise responsive to being instructed by the inter-microphone gain offset calculating unit that the inter-microphone gain offset exceeds the signal power spectrum ratio provided from the power ratio calculating unit with a predefined margin.

16. The noise suppressor according to claim 12, wherein the inter-microphone gain offset calculating unit is configured to update the inter-microphone gain offset by incrementally increasing or decreasing the most recently calculated inter-microphone gain offset with a pre-defined value on the basis of the most recently calculated signal power spectrum ratio.

17. The noise suppressor according to claim 12, further comprising two or more primary microphones and/or two or more reference microphones, wherein the power ratio calculating unit and the inter-microphone gain offset calculating unit are configured to repeat the respective calculations for at least one additional combination of one of the primary microphones and one of the reference microphones.

18. The noise suppressor according to claim 17, further comprising a selecting unit configured to select one of the primary microphones as a dominant primary microphone and to provide the signal of the dominant primary microphone to the filtering unit for noise suppression.

19. The noise suppressor according to claim 12, wherein the noise suppressing filter comprises a spectral subtraction filter, and the filtering unit is configured to calculate a frequency response of the spectral subtraction filter based on the noise power spectrum estimate.

20. The noise suppressor according to claim 19, wherein the filtering unit is configured to apply a minimum gain on the spectral subtraction filter.

21. The noise suppressor according to claim 20, wherein the filtering unit is configured to apply different minimum gains on the spectral subtraction filter depending on whether the first signal was determined by the far-field evaluating unit to comprise substantially far-field noise or substantially stationary noise.

22. The noise suppressor according to claim 12, wherein the noise suppressor resides in a communication device.

* * * * *